United States Patent
Wang et al.

(10) Patent No.: US 8,559,376 B2
(45) Date of Patent: *Oct. 15, 2013

(54) METHOD AND APPARATUS FOR DETERMINING TRANSMIT POWER

(75) Inventors: Weixin Wang, Shanghai (CN); Xueli Ma, Shanghai (CN); Zongjie Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 13/563,226

(22) Filed: Jul. 31, 2012

(65) Prior Publication Data

US 2012/0294217 A1    Nov. 22, 2012

Related U.S. Application Data

(63) Continuation of application No. 13/090,874, filed on Apr. 20, 2011, now Pat. No. 8,233,439, which is a continuation of application No. PCT/CN2009/074784, filed on Nov. 4, 2009.

(30) Foreign Application Priority Data

Nov. 4, 2008  (CN) .......................... 2008 1 0172290

(51) Int. Cl.
*H04W 4/00*   (2009.01)

(52) U.S. Cl.
USPC ........ 370/328; 370/310.2; 370/311; 370/318; 370/349; 455/13.4; 455/69; 455/127.1; 455/127.5; 455/343.2; 455/343.3; 455/343.4; 455/422.1; 455/522; 455/574; 713/300; 713/320; 375/252

(58) Field of Classification Search
USPC .............. 370/310.2, 311, 318, 328–339, 349; 455/13.4, 69, 126, 127.1, 127.5, 343.2, 455/343.3, 343.4, 422.1, 522, 574; 713/300, 310, 320–324; 375/252
See application file for complete search history.

(56) References Cited

U.S. PATENT DOCUMENTS

| | | |
|---|---|---|
| 6,744,742 B1 | 6/2004 | Koskela et al. |
| 7,586,977 B2 | 9/2009 | Usuda et al. |

(Continued)

FOREIGN PATENT DOCUMENTS

| | | |
|---|---|---|
| CN | 1430821 A | 7/2003 |
| CN | 1527522 A | 9/2004 |

(Continued)

OTHER PUBLICATIONS

Chinese Search Report in corresponding Chinese Patent Application No. 200810172290.2 (Oct. 20, 2011).

(Continued)

*Primary Examiner* — Hoon J Chung
(74) *Attorney, Agent, or Firm* — Leydig, Voit & Mayer, Ltd.

(57) ABSTRACT

A method and an apparatus for determining transmission power are disclosed. A gain factor of an E-DPDCH in a compressed mode is determined according to the number of E-DPDCHs used for initial transmission of data; and the transmission power of the E-DPDCH is determined according to the gain factor of the E-DPDCH in compressed mode. As the gain factor of E-DPDCH in compressed mode is determined according to the number of the E-DPDCHs for initial transmission of data, the gain factor of the E-DPDCH in compressed mode can be determined accurately, and thus the transmit power of the E-DPDCH can be determined accurately according to the gain factor of the E-DPDCH. Therefore, the waste of transmit power of the E-DPDCH is reduced, and thus the system capacity is improved.

12 Claims, 2 Drawing Sheets

(56) References Cited

U.S. PATENT DOCUMENTS

| | | | |
|---|---|---|---|
| 7,606,212 | B2 | 10/2009 | Kwak et al. |
| 7,729,717 | B2 | 6/2010 | Xu |
| 2003/0142979 | A1 | 7/2003 | Raaf et al. |
| 2006/0092887 | A1 | 5/2006 | Iacono et al. |
| 2006/0176867 | A1 | 8/2006 | Kwak et al. |
| 2007/0155335 | A1 | 7/2007 | Love et al. |
| 2008/0051127 | A1 | 2/2008 | Xu |
| 2008/0069035 | A1 | 3/2008 | Pinheiro et al. |
| 2009/0227256 | A1 | 9/2009 | Goto et al. |
| 2009/0290559 | A1 | 11/2009 | Pelletier et al. |
| 2010/0087202 | A1 | 4/2010 | Ventola et al. |
| 2011/0038305 | A1 | 2/2011 | Mella et al. |
| 2011/0188517 | A1 | 8/2011 | Wang et al. |
| 2011/0207419 | A1 | 8/2011 | Wang et al. |
| 2012/0282973 | A1 | 11/2012 | Usuda et al. |

FOREIGN PATENT DOCUMENTS

| | | |
|---|---|---|
| CN | 1716837 A | 1/2006 |
| CN | 1770655 A | 5/2006 |
| CN | 1855752 A | 11/2006 |
| CN | 1960197 A | 5/2007 |
| EP | 1892846 B1 | 11/2008 |
| RU | 2216862 C2 | 11/2003 |
| RU | 2328079 C2 | 6/2008 |
| WO | WO 2005/064821 A1 | 7/2005 |
| WO | WO 2008034370 A1 | 3/2008 |

OTHER PUBLICATIONS

1st Office Action in corresponding Russian Patent Application No. 2011122603/07(033491). (Jul. 3, 2012).

International Search Report in corresponding International Patent Application No. PCT/CN2009/074784 (Feb. 11, 2010).

Written Opinion of the International Searching Authority in corresponding International Patent Application No. PCT/CN2009/074784 (Feb. 11, 2010).

Related U.S. Appl. No. 13/250,073, filed (Aug. 13, 2012).

Related U.S. Appl. No. 13/090,874, filed (Aug. 13, 2012).

1st Office Action in corresponding Chinese Patent Application No. 200810172290.2 (Dec. 1, 2011).

1st Office Action in related U.S. Appl. No. 13/100,516 (Mar. 30, 2012).

Final Office Action in corresponding U.S. Appl. No. 13/250,073 (Feb. 14, 2012).

Extended European Search Report in corresponding European Patent Application No. 09824408.0 (May 25, 2012).

"3GPP 25.213—3rd Generation Partnership Project; Technical Specification Group Radio Access Network; Spreading and Modulation (FDD) (Release 6)," Mar. 2005, Version 6.2.0, 3rd Generation Partnership Project, Valbonne, France.

"3GPP TS 25.214—3rd Generation Partnership Project; Technical Specification Group Radio Access Network; Physical Layer Procedures (FDD) (Release 6)," Jun. 2005, Version 6.6.0, 3rd Generation Partnership Project, Valbonne, France.

"3GPP 25.214—3rd Generation Partnership Project; Technical Specification Group Radio Access Network; Physical Layer Procedures (FDD) (Release 7)," May 2008, Version 7.9.0, 3rd Generation Partnership Project, Valbonne, France.

"3GPP 25.214—3rd Generation Partnership Project; Technical Specification Group Radio Access Network; Physical layer procedures (FDD) (Release 8)," Sep. 2008, Version 8.3.0, 3rd Generation Partnership Project, Valbonne, France.

"R1-041412—E-DPDCH & E-DPCCH Gain Factor," 3GPP TSG-RAN WG1 #39, Nov. 15-19, 2004, 3rd Generation Partnership Project, Valbonne, France.

"R1-050060—Gain Factor Setting for E-DCH," TSG-RAN WG1 Meeting #40, Feb. 14-18, 2005, 3rd Generation Partnership Project, Valbonne, France.

"R1-084688—Correction to E-DPDCH Gain Factor Interpolation in Compressed Mode," 3GPP TSG RAN WG1 Meeting #55, Nov. 10-Nov. 14, 2008, 3rd Generation Partnership Project, Valbonne, France.

"R1-084689—Correction to E-DPDCH Gain Factor Interpolation in Compressed Mode," 3GPP TSG RAN WG1 Meeting #55, Nov. 10-Nov. 14, 2008, 3rd Generation Partnership Project, Valbonne, France.

"R1-083992—Correction to E-DPDCH Gain Factor Interpolation in Compressed Mode," 3GPP TSG-RAN WG1 Meeting #54bis, Sep. 29, 2008, 3rd Generation Partnership Project, Valbonne, France.

"R1-084176—Correction to E-DPDCH Gain Factor Interpolation in Compressed Mode," 3GPP TSG-RAN WG1 Meeting #55, Nov. 10, 2008, 3rd Generation Partnership Project, Valbonne, France.

1st Office Action in corresponding Australian Patent Application No. 2009311136 (Feb. 21, 2013).

1st Office Action in corresponding European Patent Application No. 09824408.0 (Feb. 11, 2013).

Notice of Allowance in corresponding Russian Patent Application No. 2011122603/07(033491) (Feb. 4, 2013).

Image File Wrapper in corresponding U.S. Appl. No. 13/100,516 (May 28, 2013).

"R1-041412-E-DPDCH & E-DPCCH Gain Factor," 3GPP TSG-RAN WG1 #39, Nov. 15-19, 2004, 3rd Generation Partnership Project, Yokohama, Japan.

US 8,559,376 B2

METHOD AND APPARATUS FOR DETERMINING TRANSMIT POWER

CROSS-REFERENCE TO RELATED APPLICATIONS

This application is a continuation of U.S. patent application Ser. No. 13/090,874, filed Apr. 20, 2011, which is a continuation of International Application No. PCT/CN2009/074784, filed Nov. 4, 2009, which claims priority to Chinese Patent Application No. 200810172290.2, filed Nov. 4, 2008, all of which are hereby incorporated by reference in their entireties.

This application is related to U.S. patent application Ser. No. 13/100,516, filed May 4, 2011, and U.S. patent application Ser. No. 13/250,073, filed Sep. 30, 2011, both of which are also incorporated herein by reference in their entireties.

FIELD OF THE INVENTION

The present invention relates to communications technologies, and in particular, to a method and an apparatus for determining transmit power.

BACKGROUND OF THE INVENTION

In a Wideband Code Division Multiple Access (WCDMA) system, the transmit power required by an Enhanced Dedicated Channel Dedicated Physical Data Channel (E-DPDCH) can be obtained according to an E-DPDCH gain factor. The E-DPDCH gain factor may be calculated by an extrapolation formula using one reference E-DCH Transport Format Combination (E-TFC). The extrapolation formula is as follows:

$$\beta_{ed,i,harq} = \beta_{ed,ref} \sqrt{\frac{L_{e,ref}}{L_{e,i}}} \sqrt{\frac{K_{e,i}}{K_{e,ref}}} \cdot 10^{\left(\frac{\Delta harq}{20}\right)} \quad (1)$$

In the formula above, $\beta_{ed,ref}$ denotes the E-DPDCH gain factor of the reference E-TFC; $L_{e,ref}$ denotes the number of E-DPDCH used for the reference E-TFC; $L_{e,i}$ denotes the number of E-DPDCH used for the i:th E-TFC (that is, the i:th E-TFC is corresponding to the E-DPDCH whose E-DPDCH gain factor is currently to be obtained); if a spreading factor of E-DPDCH is 2, $L_{e,i}$ and $L_{e,ref}$ denote the number of channels assuming a spreading factor of E-DPDCH is 4; $K_{e,ref}$ denotes the transport block size of the reference E-TFC; $K_{e,i}$ denotes the transport block size of the i:th E-TFC; and $\Delta harq$ denotes an offset of a Hybrid Automatic Repeat Request (HARQ), and is specified by the upper layer. Table 1 lists the values of $\Delta harq$.

TABLE 1

| Δharq Signal Value | Δharq Power Offset (dB) |
|---|---|
| 6 | 6 |
| 5 | 5 |
| 4 | 4 |
| 3 | 3 |
| 2 | 2 |
| 1 | 1 |
| 0 | 0 |

After the uplink 16 Quadrature Amplitude Modulation (16QAM) mode is introduced into the WCDMA system, the uplink service rate increases to 11.52 Mbps. With the increase of the service rate, a formula is put forward for calculating the E-DPDCH gain factor under high rate services. This formula uses two reference E-TFCs, and is called an interpolation formula. The interpolation formula is as follows:

$$\beta_{ed,i,harq} = \sqrt{\frac{L_{e,ref,1}}{L_{e,i}}} \cdot \sqrt{\left(\left(\frac{\frac{L_{e,ref,2}}{L_{e,ref,1}}\beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right)} \cdot 10^{\left(\frac{\Delta harq}{20}\right)}$$

In the formula above, $\beta_{ed,i,harq}$ denotes the E-DPDCH gain factor; $L_{e,i}$ denotes the number of E-DPDCH in non-compressed mode; $\beta_{ed,ref,1}$ and $\beta_{ed,ref,2}$ denote the E-DPDCH gain factors of the first and second reference E-TFCs respectively; $L_{e,ref,1}$ and $L_{e,ref,2}$ denote the number of E-DPDCHs used for the first and second reference E-TFCs; if the spreading factor of E-DPDCH is 2, $L_{e,ref,1}$ and $L_{e,ref,2}$ denote the number of channels assuming the spreading factor of E-DPDCH is 4; $K_{e,ref,1}$ and $K_{e,ref,2}$ denote the transport block sizes of the first and second reference E-TFCs; $K_{e,i}$ denotes the transport block size of the i:th E-TFC; and $\Delta_{harq}$ denotes the offset of the HARQ, and is specified by the upper layer.

In the prior art, if the Transmission Time Interval (TTI) is 10 ms in the compressed mode, the calculation of the E-DPDCH gain factor comes in two scenarios: the current frame is a compressed frame, and the current frame is a normal frame.

At least the following problems are found in the prior art:
in the prior art The E-DPDCH gain factor calculated out in compressed mode does not reflect the transmit power required by the E-DPDCH accurately, and the transmit power required by the E-DPDCH which is determined according to the E-DPDCH gain factor is not accurate either. Consequently, part of the transmit power of E-DPDCH is wasted and therefore the system capacity is reduced.

SUMMARY OF THE INVENTION

The embodiments of the present invention provide a method and an apparatus for determining transmit power so as to determine the transmit power of E-DPDCH accurately and improve the system capacity.

To fulfill the foregoing objectives, a method for determining a transmit power is provided in an embodiment of the present invention. The method includes:
determining the E-DPDCH gain factor in compressed mode according to the number of E-DPDCH required for initial transmission of data; and
determining transmit power of E-DPDCH according to the E-DPDCH gain factor in compressed mode.

Further, an apparatus for determining a transmit power is provided in an embodiment of the present invention. The apparatus includes:
a gain factor determining module, configured to determine an E-DPDCH gain factor in compressed mode according to the number of E-DPDCH required for initial transmission of data; and
a power determining module, configured to determine transmit power of E-DPDCH according to the E-DPDCH gain factor determined by the gain determining module.

Further still, a base station is provided in an embodiment of the present invention, and the base station includes the foregoing apparatus for determining a transmit power.

Further still, a terminal is provided in an embodiment of the present invention, and the terminal includes the foregoing apparatus for determining a transmit power.

Compared with the prior art, the present invention brings at least the following benefits: The E-DPDCH gain factor in compressed mode is determined according to the number of E-DPDCH required for initial transmission of data, and therefore, the E-DPDCH gain factor in compressed mode is determined accurately, the transmit power of E-DPDCH is determined accurately according to the E-DPDCH gain factor, the waste of transmit power of E-DPDCH is reduced, and therefore the system capacity is improved.

BRIEF DESCRIPTION OF THE DRAWINGS

To describe the technical solution under the present invention more clearly, the following describes the accompanying drawings involved in the embodiments of the present invention. Apparently, the accompanying drawings outlined below are not exhaustive and shall not constitute any limitation to the scope of the present invention.

DETAILED DESCRIPTION OF THE EMBODIMENTS

The following detailed description is provided with reference to the accompanying drawings to provide a thorough understanding of the present invention. Evidently, the drawings and the detailed description are merely representative of particular embodiments of the present invention, and the embodiments are illustrative in nature rather than exhaustive, and shall not constitute any limitation to the scope of the present invention. All other embodiments, which can be derived by those skilled in the art from the embodiments given herein without any creative efforts, fall within the scope of the present invention.

A method for determining a transmit power is provided in an embodiment of the present invention. The E-DPDCH gain factor in compressed mode is determined according to the number of E-DPDCH required for initial transmission of data, and the transmit power of E-DPDCH is determined according to the E-DPDCH gain factor. This method determines the E-DPDCH gain factor in compressed mode accurately. Because the transmit power of E-DPDCH is determined according to the E-DPDCH gain factor, the waste of transmit power of E-DPDCH is reduced, and therefore the system capacity is improved.

Figure 1:
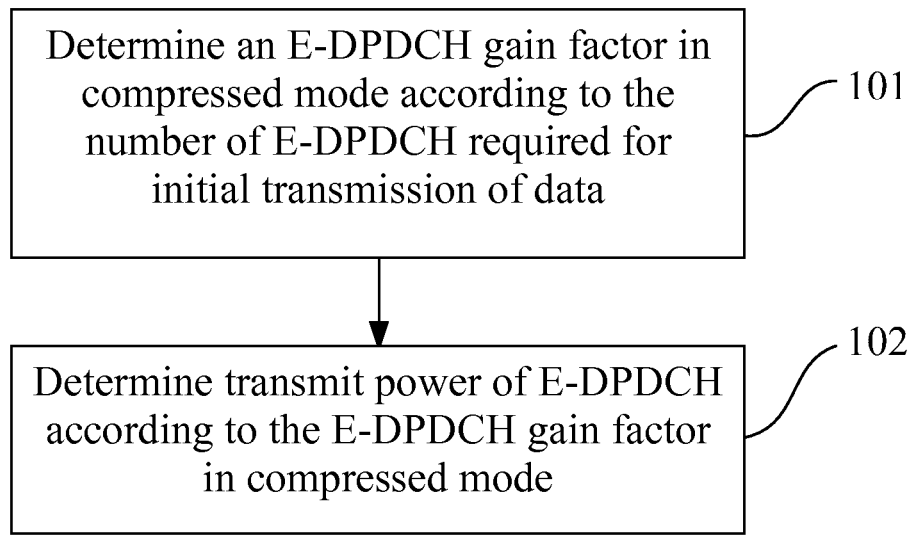
FIG. 1 is a flowchart of a method for determining transmit power in an embodiment of the present invention.

FIG. 1 is a flowchart of a method for determining a transmit power in an embodiment of the present invention. The method includes the following steps:

Step 101: Determine the E-DPDCH gain factor in compressed mode according to the number of E-DPDCH required for initial transmission of data.

In this embodiment, when a TTI is 10 ms, the E-DPDCH gain factor in compressed mode is calculated according to the number of E-DPDCH required for initial transmission of data, and interpolation formulas (2) and (3) are put forward.

Assuming $L_{e,I,i}$ denotes the number of E-DPDCH required for initial transmission of data, $\beta_{ed,C,i}$ denotes the E-DPDCH gain factor, and the current frame is a compressed frame, $$\beta_{ed,C,i} = \beta_{c,C,j} \cdot \sqrt{\frac{L_{e,ref,1}}{L_{e,I,i}}} \cdot$$

$$\sqrt{\left(\left(\frac{\frac{L_{e,ref,2}}{L_{e,ref,1}} A_{ed,ref,2}^2 - A_{ed,ref,1}^2}{K_{e,ref,2} - K_{e,ref,1}}\right)(K_{e,i} - K_{e,ref,1}) + A_{ed,ref,1}^2\right)} \cdot$$

$$10^{\left(\frac{\Delta_{harq}}{20}\right)} \cdot \sqrt{\frac{15 \cdot N_{pilot,C}}{N_{slots,I} \cdot N_{pilot,N}}}$$

(2)

Assuming $L_{e,I,i}$ denotes the number of E-DPDCH required for initial transmission of data, $\beta_{ed,R,i}$ denotes the E-DPDCH gain factor, and the current frame is a non-compressed frame, $$\beta_{ed,R,i} = \sqrt{\frac{L_{e,ref,1}}{L_{e,I,i}}} \cdot$$ (3)

$$\sqrt{\left(\left(\frac{\frac{L_{e,ref,2}}{L_{e,ref,1}} \beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right)}$$

$$\sqrt{\frac{15}{N_{slots,I}}} \cdot 10^{\left(\frac{\Delta_{harq}}{20}\right)}$$

In formula (2) and formula (3), $\beta_{c,C,j}$ denotes a Dedicated Physical Control Channel (DPCCH) gain factor used for a j:th Transport Format Combination (TFC) in compressed mode;

$$A_{ed,ref,1} = \frac{\beta_{ed,ref,1}}{\beta_c}, A_{ed,ref,2} = \frac{\beta_{ed,ref,2}}{\beta_c},$$

and $\beta_c$ is a DPCCH gain factor in non-compressed mode; $\beta_{ed,ref,1}$ and $\beta_{ed,ref,2}$ denote the E-DPDCH gain factors of the first and second reference E-TFCs respectively; $L_{e,ref,1}$ and $L_{e,ref,2}$ denote the number of E-DPDCHs used for the first and second reference E-TFCs respectively; if the spreading factor of E-DPDCH is 2, $L_{e,ref,1}$ and $L_{e,ref,2}$ denote the number of channels assuming the spreading factor of E-DPDCH is 4; $K_{e,ref,1}$ and $K_{e,ref,2}$ denote the transport block sizes of the first and second reference E-TFCs respectively; $K_{e,i}$ denotes the transport block size of the i:th E-TFC; $\Delta_{harq}$ denotes the offset of the HARQ, and is specified by the upper layer; $N_{pilot,C}$ is the number of pilot bits per slot on the DPCCH in compressed frame; $N_{pilot,N}$ is the number of pilot bits per slot on the DPCCH in non-compressed frame; $N_{slots,I}$ is the number of non Discontinuous Transmission (DTX) slots in a frame used for initial transmission of data.

Step 102: Determine transmit power of E-DPDCH according to the E-DPDCH gain factor in compressed mode.

One of the methods for determining the transmit power of the E-DPDCH is: obtain a power offset according to the ratio of the E-DPDCH gain factor to the DPCCH gain factor, and then obtain the transmit power of E-DPDCH according to the power offset and absolute power of the DPCCH.

In the method for determining the transmit power in the foregoing embodiment, the E-DPDCH gain factor in compressed mode is determined according to the number of E-DPDCH required for initial transmission of data, and therefore, the E-DPDCH gain factor in compressed mode is determined accurately, the transmit power of E-DPDCH is determined according to the E-DPDCH gain factor, the waste of transmit power of E-DPDCH is reduced, and therefore the system capacity is improved.

Figure 2:
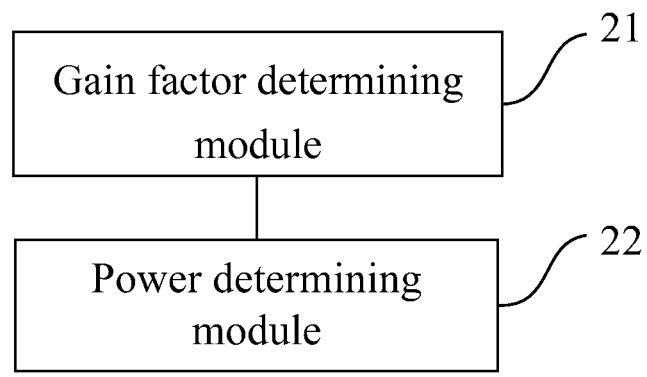
FIG. 2 shows a structure of an apparatus for determining transmit power in an embodiment of the present invention.

As shown in FIG. 2, an apparatus for determining transmit power in an embodiment of the present invention includes:

a gain factor determining module 21, configured to determine the E-DPDCH gain factor in compressed mode according to the number of E-DPDCH required for initial transmission of data; and a power determining module 22, configured to determine the transmit power of E-DPDCH according to the E-DPDCH gain factor determined by the E-DPDCH gain factor determining module 21.

Figure 3:
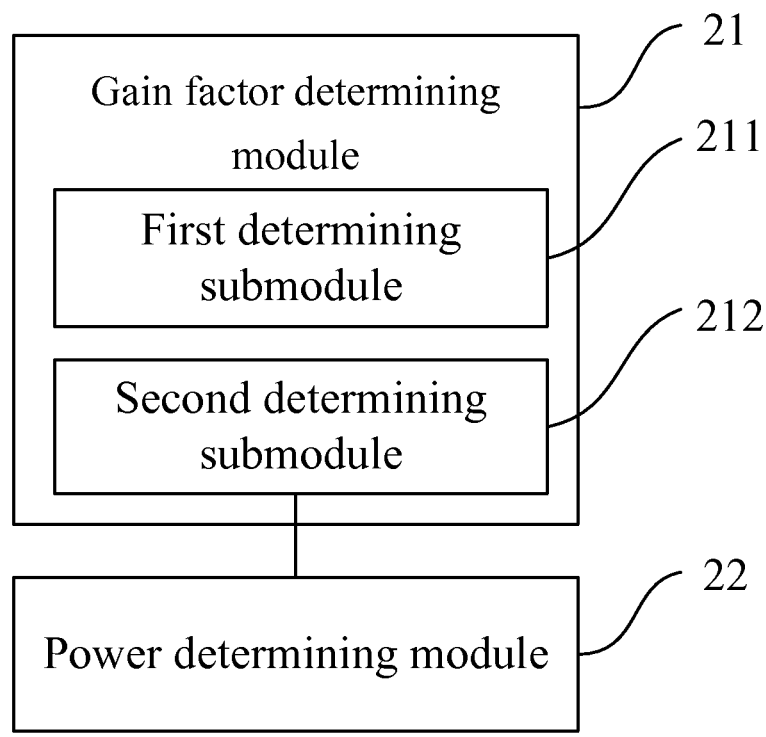
FIG. 3 shows a structure of another apparatus for determining transmit power in an embodiment of the present invention.

As shown in FIG. 3, the gain factor determining module 21 may include a first determining submodule 211 and a second determining submodule 212.

The first determining submodule 211 is configured to determine the E-DPDCH gain factor when $L_{e,I,i}$ denotes the number of E-DPDCH required for initial transmission of data, $\beta_{ed,C,i}$ denotes the E-DPDCH gain factor, and the current frame is a compressed frame:

$$\beta_{ed,C,i} = \beta_{c,C,j} \cdot \sqrt{\frac{L_{e,ref,1}}{L_{e,I,i}}} \cdot$$

$$\sqrt{\left(\left(\frac{\frac{L_{e,ref,2}}{L_{e,ref,1}} A_{ed,ref,2}^2 - A_{ed,ref,1}^2}{K_{e,ref,2} - K_{e,ref,1}}\right)(K_{e,i} - K_{e,ref,1}) + A_{ed,ref,1}^2\right)} \cdot$$

$$10^{\left(\frac{\Delta_{harq}}{20}\right)} \cdot \sqrt{\frac{15 \cdot N_{pilot,C}}{N_{slots,I} \cdot N_{pilot,N}}}$$

The second determining submodule 212 is configured to determine the E-DPDCH gain factor when $L_{e,I,i}$ denotes the number of E-DPDCH required for initial transmission of data, $\beta_{ed,R,i}$ denotes the E-DPDCH gain factor, and the current frame is a non-compressed frame:

$$\beta_{ed,R,i} =$$

$$\sqrt{\frac{L_{e,ref,1}}{L_{e,I,i}}} \cdot \sqrt{\left(\left(\frac{\frac{L_{e,ref,2}}{L_{e,ref,1}} \beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right)}$$

$$\sqrt{\frac{15}{N_{slots,I}}} \cdot 10^{\left(\frac{\Delta_{harq}}{20}\right)}$$

In the formula above, $\beta_{c,C,j}$ denotes the DPCCH gain factor used for the j:th TFC in compressed mode;

$$A_{ed,ref,1} = \frac{\beta_{ed,ref,1}}{\beta_c}, A_{ed,ref,2} = \frac{\beta_{ed,ref,2}}{\beta_c},$$

and $\beta_c$ is the DPCCH gain factor in non-compressed mode; $\beta_{e,ref,1}$ and $\beta_{e,ref,2}$ denote the E-DPDCH gain factors of the first and second reference E-TFCs; $L_{e,ref,1}$ and $L_{e,ref,2}$ denote the number of E-DPDCHs used for the first and second reference E-TFCs; $K_{e,ref,1}$ and $K_{e,ref,2}$ denote the transport block sizes of the first and second reference E-TFCs; $K_{e,i}$ denotes the transport block size of the i:th E-TFC; $\Delta_{harq}$ denotes the offset of the HARQ; $N_{pilot,C}$ is the number of pilot bits per slot on of the DPCCH in compressed frame; $N_{pilot,N}$ is the number of pilot bits per slot of the DPCCH in non-compressed frame; and $N_{slots,I}$ is the number of non DTX slots in a frame used for initial transmission of data.

In the apparatus for determining the transmit power in the foregoing embodiment, the gain factor determining module 21 determines the E-DPDCH gain factor in compressed mode according to the number of E-DPDCH required for initial transmission of data. Therefore, the E-DPDCH gain factor in compressed mode is determined accurately, the power determining module 22 determines the transmit power of E-DPDCH according to the E-DPDCH gain factor, the waste of transmit power of E-DPDCH is reduced, and therefore the system capacity is improved.

Further, a base station is provided in an embodiment of the present invention, and the base station includes the foregoing apparatus for determining transmission power. The base station may include all or part of the modules of the foregoing apparatus for determining the transmit power.

Further, a terminal is provided in an embodiment of the present invention, and the terminal includes the foregoing apparatus for determining a transmit power. The terminal may include all or part of the modules of the foregoing apparatus for determining a transmit power.

After reading the foregoing embodiments, those skilled in the art are clearly aware that the present invention may be implemented through hardware, or through software in addition to a necessary universal hardware platform. Based on such understanding, the technical solution under the present invention may be embodied in a software product. The software product may be stored in a nonvolatile storage medium (such as a Compact Disk-Read Only Memory (CD-ROM), a Universal Serial Bus (USB) disk, or a mobile hard disk), and may include several instructions that enable a computer device (such as a personal computer, a server, or a network device) to perform the method according to any embodiment of the present invention.

It is understandable to those skilled in the art that the accompanying drawings are only schematic diagrams of the exemplary embodiments, and the modules or processes in the accompanying drawings are not mandatory for implementing the present invention.

It is understandable to those skilled in the art that the modules in an apparatus provided in an embodiment of the present invention may be distributed in the apparatus described herein, or may be located in one or more apparatuses different from the apparatus described herein. The modules may be combined into one module, or split into multiple submodules.

The sequence number of the embodiment above is designed to facilitate description only, and does not represent the order of preference.

Detailed above are several exemplary embodiments of the present invention, and the scope of the present invention is not limited thereto. Any modifications or variations that can be derived by those skilled in the art shall fall within the scope of the present invention.

What is claimed is:

1. A non-transitory computer readable medium, comprising:
a computer program code comprising one or more instructions, which, when executed by a computer device, cause the computer device to determine an Enhanced Dedicated Channel Dedicated Physical Data Channel (E-DPDCH) gain factor in compressed mode, according to the number of E-DPDCHs for an initial transmission of data, and cause the computer device to transmit a signal using the determined E-DPDCH gain factor,
wherein, when a current frame is a compressed frame, the computer program code is configured to, when executed by the computer device, cause the computer device to determine the E-DPDCH gain factor in the compressed mode as follows:

$$\beta_{ed,C,i} = \beta_{c,C,j} \cdot \sqrt{\frac{L_{e,ref,1}}{L_{e,I,i}}} \cdot$$

$$\sqrt{\left(\left(\frac{\frac{L_{e,ref,2}}{L_{e,ref,1}} A_{ed,ref,2}^2 - A_{ed,ref,1}^2}{K_{e,ref,2} - K_{e,ref,1}}\right)(K_{e,i} - K_{e,ref,1}) + A_{ed,ref,1}^2\right)} \cdot$$

$$10^{\left(\frac{\Delta_{harq}}{20}\right)} \cdot \sqrt{\frac{15 \cdot N_{pilot,C}}{N_{slots,I} \cdot N_{pilot,N}}}$$

wherein,
$\beta_{ed,C,i}$ denotes the E-DPDCH gain factor in the compressed mode,
$L_{e,I,i}$ denotes the number of the E-DPDCHs for the initial transmission of data,
$\beta_{c,C,j}$ denotes a Dedicated Physical Control Channel (DPCCH) gain factor used for the j:th TFC in the compressed mode, $$A_{ed,ref,1} = \frac{\beta_{ed,ref,1}}{\beta_c},$$

and $$A_{ed,ref,2} = \frac{\beta_{ed,ref,2}}{\beta_c},$$

where $\beta_c$ is a DPCCH gain factor in non-compressed mode,
$\beta_{ed,ref,1}$ and $\beta_{ed,ref,2}$ denote the E-DPDCH gain factors of a first and a second reference E-TFCs, respectively,
$L_{e,ref,1}$ and $L_{e,ref,2}$ denote the number of the E-DPDCHs used for the first and second reference E-TFCs, respectively,
$K_{e,ref,1}$ and $K_{e,ref,2}$ denote transport block sizes of the first and second reference E-TFCs, respectively,
$K_{e,i}$ denotes the transport block size of the i:th E-TFC,
$\Delta_{harq}$ denotes an offset of a Hybrid Automatic Repeat Request (HARQ),
$N_{pilot,C}$ denotes the number of pilot bits per slot on a DPCCH in the compressed mode,
$N_{pilot,N}$ denotes the number of pilot bits per slot on the DPCCH in the non-compressed mode,
$N_{slots,I}$ denotes the number of non Discontinuous Transmission (DTX) slots in a frame used for the initial transmission of data.

2. The non-transitory computer readable medium according to claim 1, wherein the computer program code, when executed by the computer device, further causes the computer device to determine a transmit power of the E-DPDCH according to the E-DPDCH gain factor in the compressed mode.

3. The non-transitory computer readable medium according to claim 2, wherein the computer program code, when executed by the computer device, causes the computer device to further determine a power offset according to a ratio of the E-DPDCH gain factor in the compressed mode to the DPCCH gain factor in the compressed mode, and determine the transmit power of the E-DPDCH according to the determined power offset and an absolute power of the DPCCH.

4. A non-transitory computer readable medium comprising:
a computer program code comprising one or more instructions, which, when executed by a computer device, causes the computer device to an Enhanced Dedicated Channel Dedicated Physical Data Channel (E-DPDCH) gain factor in compressed mode according to the number of E-DPDCH for an initial transmission of data, and cause the computer device to transmit a signal using the determined E-DPDCH gain factor,
wherein, when a current frame is a non-compressed frame, the computer program code is configured to, when executed by the computer device, cause the computer device to determine the E-DPDCH gain factor as follows:

$$\beta_{ed,R,i} =$$

$$\sqrt{\frac{L_{e,ref,1}}{L_{e,I,i}}} \cdot \sqrt{\left(\left(\frac{\frac{L_{e,ref,2}}{L_{e,ref,1}} \beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right)}$$

$$\sqrt{\frac{15}{N_{slots,I}}} \cdot 10^{\left(\frac{\Delta_{harq}}{20}\right)},$$

wherein,
$\beta_{ed,R,i}$ denotes the E-DPDCH gain factor in the compressed mode,
$L_{e,I,i}$ denotes the number of the E-DPDCHs used for the initial transmission of data,
$\beta_{ed,ref,1}$ and $\beta_{ed,ref,2}$ denote E-DPDCH gain factors of first and second reference E-TFCs, respectively,
$L_{e,ref,1}$ and $L_{e,ref,2}$ denote the number of the E-DPDCHs used for the first and second reference E-TFCs, respectively,
$K_{e,ref,1}$ and $K_{e,ref,2}$ denote transport block sizes of the first and second reference E-TFCs, respectively,
$K_{e,i}$ denotes transport block size of the i:th E-TFC,
$\Delta_{harq}$ denotes an offset of a hybrid automatic repeat request (HARD), and
$N_{slots,I}$ denotes the number of non Discontinuous Transmission (DTX) slots in a frame used for the initial transmission of data.

5. The non-transitory computer readable medium according to claim 4, wherein the computer program code, when executed by the computer device, further causes the computer device to determine a transmit power of the E-DPDCH according to the determined E-DPDCH gain factor in the compressed mode.

6. The non-transitory computer readable medium according to claim 5, wherein the computer program code, when executed by the computer device, causes the computer device to:
further determine a power offset according to a ratio of the E-DPDCH gain factor in the compressed mode to a Dedicated Physical Control Channel (DPCCH) gain factor, and
determine the transmit power of the E-DPDCH according to the determined power offset and an absolute power of a DPCCH.

7. A network apparatus comprising:
a memory; and
a processor configured to execute one or more instructions stored in the memory,
wherein, when a current frame is a compressed frame, the instructions are configured to determine, according to the number of E-DPDCHs for an initial transmission of data, an Enhanced Dedicated Channel Dedicated Physical Data Channel (E-DPDCH) gain factor in compressed mode as follows:

$$\beta_{ed,C,i} = \beta_{c,C,j} \cdot \sqrt{\frac{L_{e,ref,1}}{L_{e,I,i}}} \cdot$$

$$\sqrt{\left(\left(\frac{\frac{L_{e,ref,2}}{L_{e,ref,1}} A_{ed,ref,2}^2 - A_{ed,ref,1}^2}{K_{e,ref,2} - K_{e,ref,1}}\right)(K_{e,i} - K_{e,ref,1}) + A_{ed,ref,1}^2\right)} \cdot$$

$$10^{\left(\frac{\Delta_{harq}}{20}\right)} \cdot \sqrt{\frac{15 \cdot N_{pilot,C}}{N_{slots,I} \cdot N_{pilot,N}}}$$

wherein,
$\beta_{ed,C,i}$ denotes the E-DPDCH gain factor in the compressed mode,
$L_{e,I,i}$ denotes the number of the E-DPDCHs for the initial transmission of data,
$\beta_{c,C,j}$ denotes a Dedicated Physical Control Channel (DPCCH) gain factor used for the j:th TFC in the compressed mode, $$A_{ed,ref,1} = \frac{\beta_{ed,ref,1}}{\beta_c},$$

and $$A_{ed,ref,2} = \frac{\beta_{ed,ref,2}}{\beta_c},$$

where $\beta_c$ is a DPCCH gain factor in non-compressed mode,
$\beta_{ed,ref,1}$ and $\beta_{ed,ref,2}$ denote the E-DPDCH gain factors of a first and a second reference E-TFCs, respectively,
$L_{e,ref,1}$ and $L_{e,ref,2}$ denote the number of the E-DPDCHs used for the first and second reference E-TFCs, respectively,
$K_{e,ref,1}$ and $K_{e,ref,2}$ denote transport block sizes of the first and second reference E-TFCs, respectively,
$K_{e,i}$ denotes the transport block size of the i:th E-TFC,
$\Delta^{harq}$ denotes an offset of a Hybrid Automatic Repeat Request (HARQ), $N_{pilot,C}$ denotes the number of pilot bits per slot on a DPCCH in the compressed mode,
$N_{pilot,N}$ denotes the number of pilot bits per slot on the DPCCH in the non-compressed mode, and
$N_{slots,I}$ denotes the number of non Discontinuous Transmission (DTX) slots in a frame used for the initial transmission of data.

8. The apparatus according to claim 7, wherein the instructions are further configured to determine a transmit power of the E-DPDCH according to the E-DPDCH gain factor in the compressed mode.

9. The apparatus according to claim 8, wherein instructions are further configured to determine a power offset according to a ratio of the E-DPDCH gain factor in the compressed mode to the DPCCH gain factor in the compressed mode, and wherein the transmit power of the E-DPDCH is determined according to the determined power offset and an absolute power of the DPCCH.

10. An apparatus comprising:
a memory; and
a processor configured to perform one or more instructions,
wherein, when a current frame is a non-compressed frame, the instructions are configured to determine, according to the number of E-DPDCHs for an initial transmission of data, an Enhanced Dedicated Channel Dedicated Physical Data Channel (E-DPDCH) gain factor in compressed mode as follows:

$$\beta_{ed,R,i} = \sqrt{\frac{L_{e,ref,1}}{L_{e,I,i}}} \cdot \sqrt{\left(\left(\frac{\frac{L_{e,ref,2}}{L_{e,ref,1}} \beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right)}$$

$$\sqrt{\frac{15}{N_{slots,I}}} \cdot 10^{\left(\frac{\Delta_{harq}}{20}\right)},$$

wherein,
$\beta_{ed,R,i}$ denotes the E-DPDCH gain factor in the compressed mode,
$L_{e,I,i}$ denotes the number of the E-DPDCHs used for the initial transmission of data,
$\beta_{ed,ref,1}$ and $\beta_{ed,ref,2}$ denote E-DPDCH gain factors of first and second reference E-TFCs, respectively,
$L_{e,ref,1}$ and $L_{e,ref,2}$ denote the number of the E-DPDCHs used for the first and second reference E-TFCs, respectively,
$K_{e,ref,1}$ and $K_{e,ref,2}$ denote transport block sizes of the first and second reference E-TFCs, respectively,
$K_{e,i}$ denotes transport block size of the i:th E-TFC,
$\Delta_{harq}$ denotes an offset of a hybrid automatic repeat request (HARQ), and
$N_{slots,I}$ denotes the number of non Discontinuous Transmission (DTX) slots in a frame used for the initial transmission of data.

11. The apparatus according to claim 10, wherein the instructions are further configured to determine a transmit power of the E-DPDCH according to the determined E-DPDCH gain factor in the compressed mode.

12. The apparatus according to claim 10, wherein the instructions are configured to further determine a power offset according to a ratio of the E-DPDCH gain factor in the compressed mode to a Dedicated Physical Control Channel (DPCCH) gain factor, wherein the transmit power of the E-DPDCH is determined according to the determined power offset and an absolute power of a DPCCH.

\* \* \* \* \*

UNITED STATES PATENT AND TRADEMARK OFFICE
CERTIFICATE OF CORRECTION

| | | |
|---|---|---|
| PATENT NO. | : 8,559,376 B2 | Page 1 of 1 |
| APPLICATION NO. | : 13/563226 | |
| DATED | : October 15, 2013 | |
| INVENTOR(S) | : Wang et al. | |

It is certified that error appears in the above-identified patent and that said Letters Patent is hereby corrected as shown below:

In the Claims:

Column 8, Claim 4, Line 58, "(HARD), and" should read -- (HARQ), and --.

Signed and Sealed this
Twenty-eighth Day of January, 2014

Michelle K. Lee
*Deputy Director of the United States Patent and Trademark Office*